United States Patent
Liao et al.

(10) Patent No.: US 8,242,697 B2
(45) Date of Patent: Aug. 14, 2012

(54) LIGHT EMITTING DIODE STREET LAMP WITH SENSORS

(75) Inventors: Ming-Yang Liao, Taipei Hsien (TW); Chia-Ying Wu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 344 days.

(21) Appl. No.: 12/615,366

(22) Filed: Nov. 10, 2009

(65) Prior Publication Data
US 2010/0295452 A1 Nov. 25, 2010

(30) Foreign Application Priority Data

May 21, 2009 (CN) .......................... 2009 1 0302515

(51) Int. Cl.
*H05B 37/02* (2006.01)
(52) U.S. Cl. .................................... 315/158; 315/308
(58) Field of Classification Search .................. 315/149, 315/152, 158, 291, 307, 308
See application file for complete search history.

(56) References Cited

U.S. PATENT DOCUMENTS

| | | | |
|---|---|---|---|
| 7,358,679 B2 * | 4/2008 | Lys et al. | 315/51 |
| 2008/0158354 A1 * | 7/2008 | Hutchison | 348/143 |
| 2008/0173089 A1 * | 7/2008 | Wright et al. | 73/335.04 |
| 2011/0001438 A1 * | 1/2011 | Chemel et al. | 315/297 |

* cited by examiner

*Primary Examiner* — Thuy Vinh Tran
(74) *Attorney, Agent, or Firm* — Altis Law Group, Inc.

(57) ABSTRACT

An exemplary light emitting diode street lamp includes a light emitting diode array, a brightness sensor, a humidity sensor, and a controlling system. The brightness sensor senses the brightness of the environment. The humidity sensor senses the humidity of the environment. The controlling system is electrically connected to the light emitting diode array, the humidity sensor and the brightness sensor. Three ranges of humidity and three ranges of brightness are predefined in the controlling system. The controlling system controls the light emitting diode array to emit an amount of light according to a relationship between the sensed humidity value and the humidity ranges, and according to a relationship between the sensed brightness value and the brightness ranges.

20 Claims, 1 Drawing Sheet

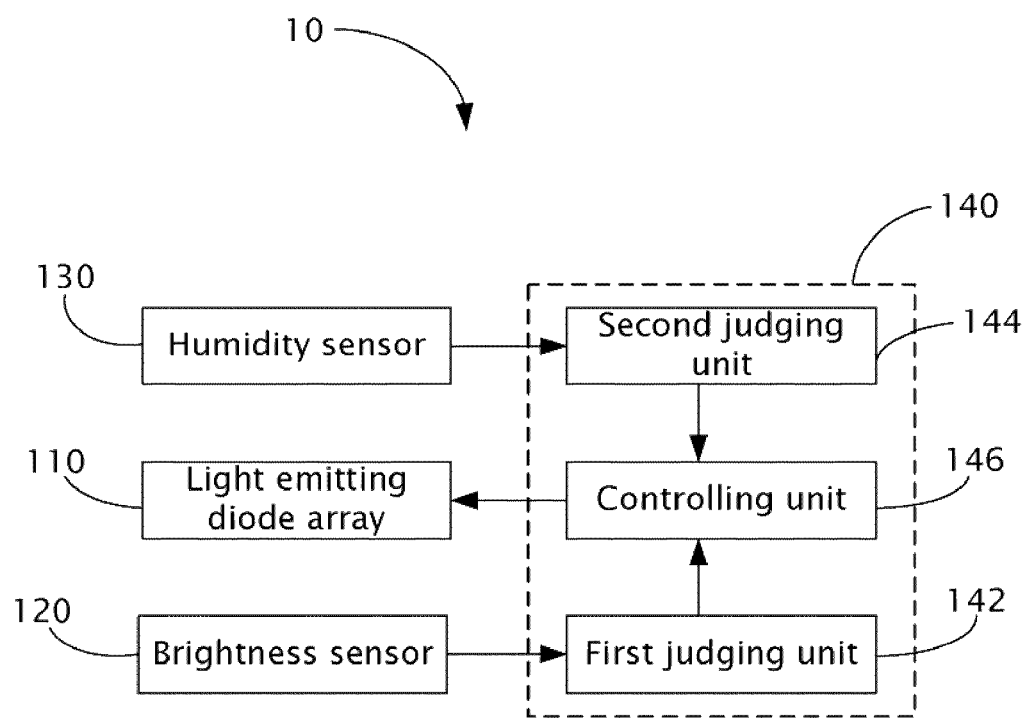

LIGHT EMITTING DIODE STREET LAMP WITH SENSORS

BACKGROUND

1. Technical Field

The present disclosure relates to street lamps and, particularly, to a light emitting diode street lamp with a brightness sensor and a humidity sensor.

2. Description of Related Art

A conventional light emitting diode street lamp uses a light emitting diode array as a light source. Typically, the luminance of the light emitting diode street lamp can self-adjust according to the brightness of the environment. However, on rainy or foggy days, light visibility may become low due to moisture in the air. In these conditions, the light emitting diode street lamp may not self-adjust appropriately.

Therefore, it is desirable to provide a light emitting diode street lamp which can overcome or at least alleviate the above-mentioned problems.

BRIEF DESCRIPTION OF THE DRAWINGS

The drawing is a function block diagram of a light emitting diode street lamp according to an exemplary embodiment.

DETAILED DESCRIPTION

Embodiments of the disclosure will now be described in detail with reference to the accompanying drawings.

A light emitting diode street lamp 10 according to an exemplary embodiment includes a light emitting diode array 110, a brightness sensor 120, a humidity sensor 130, and a controlling system 140.

The light emitting diode array 110 includes a number of light emitting diodes (not shown) arranged in matrix. In this embodiment, a diameter of each light emitting diode is about 5 millimeters, and a power rating of each light emitting diode is about 25 watts.

The brightness sensor 120 is configured for sensing a brightness T1 of an environment where the light emitting diode street lamp 10 is used, and obtaining a corresponding brightness value. That is, the brightness sensor 120 senses an intensity of the environmental light. For example, the brightness sensor 120 may be a photodiode or photometer.

The humidity sensor 130 is configured for sensing a humidity T2 of the environment, and obtaining a corresponding humidity value. In this embodiment, the humidity sensor 130 is positioned on a pole (not shown) where the street lamp 10 is fixed and exposed to the air. The humidity sensor 130 can be a capacitive humidity sensor or a resistive humidity sensor.

The controlling system 140 includes a first judging unit 142, a second judging unit 144, and a controlling unit 146. The controlling unit 146 is electrically connected to the first judging unit 142, the second judging unit 144, and the light emitting diode array 110. The first judging unit 142 is electrically connected to the brightness sensor 120. The second judging unit 144 is electrically connected to the humidity sensor 130.

A first brightness range B1, a second brightness range B2, and a third brightness range B3 are predefined in the first judging unit 142. Each brightness value in the first brightness range B1 is smaller than each brightness value in the second brightness range B2. Each brightness value in the second brightness range B2 is smaller than each brightness value in the third brightness range B3. In this embodiment, a standard brightness value of the environment is in the second brightness range B2. The first judging unit 142 receives the brightness value T1 sensed by the brightness sensor 120, and determines which brightness range the brightness value T1 falls into.

A first humidity range H1, a second humidity range H2, and a third humidity range H3 are predefined in the second judging unit 144. Each humidity value in the first humidity range H1 is smaller than each humidity value in the second brightness range H2. Each humidity value in second brightness range H2 is smaller than each humidity value in the third brightness range H3. In this embodiment, a standard humidity value of the environment is in the second humidity range. The second judging unit 144 receives the humidity value T2 sensed by the humidity sensor 130, and determines which humidity range the humidity value T2 falls into.

A first voltage V1, a second voltage V2, and a third voltage V3 are predefined in the controlling unit 146. The first voltage V1 is smaller than the second voltage V2. The second voltage V2 is smaller than the third voltage V3. In this embodiment, the light emitting diode array 110 is in a normal working state when the second voltage V2 is applied to the light emitting diode array 110; and the value of the first voltage V1 is 0.

Table 1 below shows the relationship between the voltage applied to the light emitting diode array 10, the brightness of the environment, and the humidity of the environment.

| Humidity range | Brightness range | | |
| --- | --- | --- | --- |
| | B1 | B2 | B3 |
| | | Voltage | |
| H1 | V2 | V2 | V1 |
| H2 | V3 | V2 | V1 |
| H3 | V3 | V2 | V2 |

If the sensed humidity value T2 is in the first humidity range H1 and the sensed brightness value T1 is in the first brightness range B1, the controlling unit 146 applies the second voltage V2 to the light emitting diode array 110. That is, the humidity and the brightness of the environment become lower, and the controlling unit 146 applies the standard voltage to the light emitting diode array 110.

If the sensed humidity value T2 is in the first humidity range H1 and the sensed brightness value T1 is in the second brightness range B2, the controlling unit 146 applies the second voltage V2 to the light emitting diode array 110. That is, when the humidity is low and the brightness of the environment is normal, the controlling unit 146 applies the standard voltage to the light emitting diode array 110.

If the sensed humidity value T2 is in the first humidity range H1 and the sensed brightness value T1 is in the third brightness range B3, the controlling unit 146 applies the voltage V1 to the light emitting diode array 110. That is, when the humidity is low and the brightness of the environment is high, the controlling unit 146 turns off the light emitting diode array 110.

If the sensed humidity value T2 is in the second humidity range H2 and the sensed brightness value T1 is in the first brightness range B1, the controlling unit 146 applies the third voltage V3 to the light emitting diode array 110. That is, when the humidity is normal and the brightness of the environment is low, the controlling unit 146 applies the high voltage to the light emitting diode array 110.

If the sensed humidity value T2 is in the third humidity range H3 and the sensed brightness value T1 is in the first brightness range B1, the controlling unit 146 applies the third voltage V3 to the light emitting diode array 110. That is, when the humidity is high and the brightness of the environment is low, the controlling unit 146 applies the high voltage to the light emitting diode array 110.

In summary, the light emitting diode street lamp 10 can adjust the luminance of the light emitting diode array 110 according to the humidity and the brightness of the environment.

It is to be understood, however, that even though numerous characteristics and advantages of various embodiments have been set forth in the foregoing description, together with details of the structures and functions of the embodiments, the disclosure is illustrative only; and that changes may be made in details, especially in matters of arrangement of parts within the principles of the invention to the full extent indicated by the broad general meaning of the terms in which the appended claims are expressed.

What is claimed is:

1. A light emitting diode street lamp comprising:
    a light emitting diode array;
    a brightness sensor configured for sensing a brightness of an environment;
    a humidity sensor configured for sensing a humidity of the environment; and
    a controlling system electrically connected to the light emitting diode array, the humidity sensor, and the brightness sensor, a plurality of humidity ranges and a plurality of brightness ranges predefined in the controlling system, wherein the controlling system is configured for controlling the light emitting diode array to emit an amount of light according to a relationship between the sensed humidity and the plurality of humidity ranges, and according to a relationship between the sensed brightness and the plurality of brightness ranges;
    wherein the humidity sensor is a capacitive humidity sensor or a resistive humidity sensor;
    wherein the controlling system comprises a first judging unit, at least two brightness ranges are predefined in the first judging unit, and the first judging unit is configured for receiving a brightness value sensed by the brightness sensor and determining which brightness range the brightness value falls into.

2. The light emitting diode street lamp of claim 1, wherein the controlling system further comprises a second judging unit, at least two humidity ranges are predefined in the second judging unit, and the second judging unit is configured for receiving a humidity value sensed by the humidity sensor and determining which humidity range the humidity value falls into.

3. The light emitting diode street lamp of claim 2, wherein the controlling system further comprises a controlling unit, at least two voltages are predefined in the controlling unit, and the controlling unit is configured for applying a corresponding one of the at least two voltages to the light emitting diode array according to the determination of which humidity range the sensed humidity value falls into and according to the determination of which brightness range the sensed brightness value falls into.

4. The light emitting diode street lamp of claim 3, wherein the at least two brightness ranges comprise a first brightness range, a second brightness range, and a third brightness range, each brightness value in the first brightness range is smaller than each brightness value in the second brightness range, and each brightness value in the second brightness range is smaller than each brightness value in the third brightness range.

5. The light emitting diode street lamp of claim 4, wherein the at least two humidity ranges comprise a first humidity range, a second humidity range, and a third humidity range, each humidity value in the first humidity range is smaller than each humidity value in the second humidity range, and each humidity value in the second humidity range is smaller than each humidity value in the third humidity range.

6. The light emitting diode street lamp of claim 5, wherein the at least two voltage comprise a first voltage, a second voltage, and a third voltage, the first voltage is smaller than the second voltage, the second voltage is smaller than the third voltage.

7. The light emitting diode street lamp of claim 6, wherein the controlling unit is further configured for applying the second voltage to the light emitting diode array when the sensed humidity value is in the first humidity range and the sensed brightness value is in the first brightness range.

8. The light emitting diode street lamp of claim 6, wherein the controlling unit is further configured for applying the second voltage to the light emitting diode array when the sensed humidity value is in the first humidity range and the sensed brightness value is in the second brightness range.

9. The light emitting diode street lamp of claim 6, wherein the controlling unit is further configured for applying the first voltage to the light emitting diode array when the sensed humidity value is in the first humidity range and the sensed brightness value is in the third brightness range.

10. The light emitting diode street lamp of claim 6, wherein the controlling unit is further configured for applying the third voltage to the light emitting diode array when the sensed humidity value is in the second humidity range and the sensed brightness value is in the first brightness range.

11. The light emitting diode street lamp of claim 6, wherein the controlling unit is further configured for applying the third voltage to the light emitting diode array when the sensed humidity value is in the third humidity range and the sensed brightness value is in the first brightness range.

12. The light emitting diode street lamp of claim 6, wherein the value of the first voltage is 0.

13. A light emitting diode street lamp comprising:
    a light emitting diode array comprising a plurality of light emitting diodes;
    a brightness sensor for sensing a brightness value of an ambient environment;
    a humidity sensor for sensing a humidity value of the ambient environment; and
    a controlling system electrically connect to the light emitting diode array, the humidity sensor, and the brightness sensor, a plurality of predefined humidity value ranges and a plurality of predefined brightness value ranges stored in the controlling system, wherein the controlling system controls the light emitting diode array to emit an intensity of light according to a comparison between the sensed humidity value and the plurality of humidity value ranges and according to a comparison between the sensed brightness value and the plurality of brightness value ranges;
    wherein the controlling system comprises a first judging unit, the first judging unit is configured for receiving the brightness value sensed by the brightness sensor and determining which brightness value range the sensed brightness value falls into.

14. The light emitting diode street lamp of claim 13, wherein the controlling system further comprises a second judging unit, the second judging unit is configured for receiving the humidity value sensed by the humidity sensor and determining which humidity value range the sensed humidity value falls into.

15. The light emitting diode street lamp of claim 14, wherein the controlling system further comprises a controlling unit, at least two voltages are predefined in the controlling unit, and the controlling unit is configured for applying a corresponding one of the at least two voltages to the light emitting diode array according to the determination of which humidity value range the sensed humidity value falls into and according to the determination of which brightness value range the sensed brightness value falls into.

16. The light emitting diode street lamp of claim 13, wherein the humidity sensor is a capacitive humidity sensor.

17. The light emitting diode street lamp of claim 13, wherein the humidity sensor is a resistive humidity sensor.

18. A light source comprising:
a light emitting diode (LED) array;
a sensor module configured for sensing an ambient brightness value and an ambient humidity value; and
a controller electrically connect to the LED array and the sensor module, the controller being configured for controlling an intensity of light emitted by the LED array according to the ambient brightness value and the ambient humidity value, wherein the controller comprises:
a storing unit for storing a plurality of predefined humidity value ranges and a plurality of predefined brightness value ranges; and
a judging unit for receiving the ambient brightness value and the ambient humidity value from the sensor module, and determining which brightness value range the ambient brightness value falls into and which humidity value range the ambient humidity value falls into.

19. The light source of claim 18, wherein the controller further comprises a controlling unit, the controlling unit is configured for applying a corresponding predefined voltage to the LED array according to a determination result of the judging unit.

20. The light source of claim 19, wherein the humidity sensor is a capacitive humidity sensor or a resistive humidity sensor.

* * * * *